(12) United States Patent
Trainer et al.

(10) Patent No.: US 9,490,693 B2
(45) Date of Patent: **\*Nov. 8, 2016**

(54) CONVERTER FOR HVDC TRANSMISSION AND REACTIVE POWER COMPENSATION

(71) Applicant: ALSTOM Technology Ltd., Baden (CH)

(72) Inventors: David Trainer, Derby (GB); Colin Charnock Davidson, Staffordshire (GB); Nnamdi Okaeme, London (GB)

(73) Assignee: Alstom Technology Ltd., Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,246

(22) Filed: Apr. 13, 2015

(65) Prior Publication Data

US 2015/0214834 A1    Jul. 30, 2015

Related U.S. Application Data

(63) Continuation of application No. 13/805,333, filed as application No. PCT/EP2010/058630 on Jun. 18, 2010, now Pat. No. 9,065,299.

(51) Int. Cl.
*H02M 7/757* (2006.01)
*H02H 7/26* (2006.01)
(Continued)

(52) U.S. Cl.
CPC .............. *H02M 1/4208* (2013.01); *G05F 1/70* (2013.01); *H02J 3/36* (2013.01); *H02M 7/04* (2013.01);
(Continued)

(58) Field of Classification Search
CPC ............. H02M 7/7575; H02M 5/458; H02M 5/4585; H02M 5/4505; H02M 1/4266; H02M 1/32; H02M 3/1582; H02M 3/1584; H02H 7/261; H02H 7/1216; H02J 3/36; H02J 3/01
USPC ................ 363/34, 35, 36, 52, 53, 54, 65, 66
See application file for complete search history.

(56) References Cited

U.S. PATENT DOCUMENTS

| 3,857,083 A | 12/1974 | Lundstrom |
| 3,867,643 A | 2/1975 | Baker |

(Continued)

FOREIGN PATENT DOCUMENTS

| CN | 101 795 072 | 8/2010 |
| DE | 43 17 965 A1 | 12/1994 |

(Continued)

OTHER PUBLICATIONS

Allebrod, S. et al., "New Transformerless, Scalable Modular Multilevel Converters for HVDC-Transmission", Power Electronics Specialists Conference, IEEE, Jun. 15, 2008, pp. 174-179.

(Continued)

*Primary Examiner* — Timothy J Dole
*Assistant Examiner* — Sisay G Tiku
(74) *Attorney, Agent, or Firm* — Nixon Peabody LLP; Khaled Shami

(57) ABSTRACT

A power electronic converter for use in high voltage direct current power transmission and reactive power compensation comprises a plurality of switching elements interconnecting in use a DC network and one or more AC networks, the plurality of switching elements being controllable in use to facilitate power conversion between the AC and DC networks, wherein in use, the plurality of switching elements are controllable to form one or more short circuits within the power electronic converter so as to define one or more primary current flow paths, the or each primary current flow path including a respective one of the AC networks and the power electronic converter and bypassing the DC network.

19 Claims, 8 Drawing Sheets

(51) Int. Cl.
| | |
|---|---|
| *H02M 5/458* | (2006.01) |
| *H02M 5/45* | (2006.01) |
| *H02M 1/42* | (2007.01) |
| *H02J 3/36* | (2006.01) |
| *H02M 7/483* | (2007.01) |
| *G05F 1/70* | (2006.01) |
| *H02M 7/04* | (2006.01) |

(52) U.S. Cl.
CPC ..... *H02M 7/483* (2013.01); *H02M 2007/4835* (2013.01); *Y02E 60/60* (2013.01); *Y10T 307/50* (2015.04)

(56) References Cited

U.S. PATENT DOCUMENTS

| | | | |
|---|---|---|---|
| 4,053,820 A | 10/1977 | Peterson et al. | |
| 4,636,907 A | 1/1987 | Howell | |
| 4,663,702 A | 5/1987 | Tanaka | |
| 4,816,736 A | 3/1989 | Dougherty et al. | |
| 5,093,583 A | 3/1992 | Mashino et al. | |
| 5,164,872 A | 11/1992 | Howell | |
| 5,339,210 A | 8/1994 | Howell | |
| 5,345,375 A | 9/1994 | Mohan | |
| 5,499,178 A | 3/1996 | Mohan | |
| 5,515,264 A | 5/1996 | Stacey | |
| 5,532,575 A | 7/1996 | Ainsworth et al. | |
| 5,644,482 A | 7/1997 | Asplund | |
| 5,673,189 A | 9/1997 | Schettler | |
| 5,719,486 A | 2/1998 | Taniguchi et al. | |
| 5,726,557 A | 3/1998 | Umeda et al. | |
| 5,870,293 A | 2/1999 | Svensson et al. | |
| 5,889,667 A | 3/1999 | Bernet | |
| 5,892,677 A | 4/1999 | Chang | |
| 5,936,855 A | 8/1999 | Salmon | |
| 5,999,422 A | 12/1999 | Goransson et al. | |
| 6,134,126 A | 10/2000 | Ikekame et al. | |
| 6,236,580 B1 | 5/2001 | Aiello et al. | |
| 6,301,130 B1 | 10/2001 | Aiello et al. | |
| 6,320,767 B1 | 11/2001 | Shimoura et al. | |
| 6,392,348 B1 | 5/2002 | Dougherty | |
| 6,879,062 B2 | 4/2005 | Oates | |
| 6,987,680 B2 | 1/2006 | Vire et al. | |
| 7,170,767 B2 | 1/2007 | Bixel | |
| 7,274,576 B1 | 9/2007 | Zargari et al. | |
| 7,292,462 B2 | 11/2007 | Watanabe et al. | |
| 7,298,115 B2 | 11/2007 | Nishimura et al. | |
| 7,499,291 B2 | 3/2009 | Han | |
| 7,622,825 B2 | 11/2009 | Brune et al. | |
| 7,633,770 B2 * | 12/2009 | Datta | H02M 7/49 363/35 |
| 7,851,943 B2 * | 12/2010 | Datta | H02J 1/06 307/38 |
| 8,188,720 B2 | 5/2012 | Kim et al. | |
| 8,390,259 B2 | 3/2013 | Dommaschk et al. | |
| 8,599,591 B2 | 12/2013 | Crookes et al. | |
| 8,854,843 B2 | 10/2014 | Trainer et al. | |
| 8,861,231 B2 | 10/2014 | Cross et al. | |
| 8,861,234 B2 | 10/2014 | Trainer et al. | |
| 8,867,242 B2 | 10/2014 | Clare et al. | |
| 8,867,244 B2 | 10/2014 | Trainer et al. | |
| 2002/0060497 A1 | 5/2002 | Arita et al. | |
| 2002/0176265 A1 | 11/2002 | Oates | |
| 2003/0202367 A1 | 10/2003 | Schreiber | |
| 2004/0218318 A1 | 11/2004 | Bijlenga et al. | |
| 2005/0127853 A1 | 6/2005 | Su | |
| 2005/0135126 A1 | 6/2005 | Gazel et al. | |
| 2005/0146226 A1 | 7/2005 | Trainer et al. | |
| 2006/0097519 A1 * | 5/2006 | Steinke | F03D 9/005 290/44 |
| 2008/0002443 A1 | 1/2008 | Ueda et al. | |
| 2008/0007978 A1 | 1/2008 | Han | |
| 2008/0179951 A1 | 7/2008 | Brune et al. | |
| 2008/0205093 A1 | 8/2008 | Davies et al. | |
| 2008/0310205 A1 | 12/2008 | Hiller | |
| 2009/0027934 A1 | 1/2009 | Bustos | |
| 2009/0085548 A1 | 4/2009 | Suh et al. | |
| 2009/0102436 A1 | 4/2009 | Valderrama et al. | |
| 2009/0206781 A1 | 8/2009 | Itoh et al. | |
| 2009/0295225 A1 * | 12/2009 | Asplund | H02M 7/7575 307/31 |
| 2010/0067266 A1 | 3/2010 | Dommaschk et al. | |
| 2010/0118578 A1 | 5/2010 | Dommaschk et al. | |
| 2010/0133901 A1 * | 6/2010 | Zhang | H02M 5/458 307/11 |
| 2010/0309698 A1 | 12/2010 | Asplund et al. | |
| 2011/0018481 A1 | 1/2011 | Hiller | |
| 2011/0205768 A1 | 8/2011 | Svensson | |
| 2011/0260701 A1 | 10/2011 | Horger et al. | |
| 2012/0026767 A1 | 2/2012 | Inoue et al. | |
| 2012/0069610 A1 | 3/2012 | Trainer et al. | |
| 2012/0113699 A1 | 5/2012 | Crookes et al. | |
| 2012/0120697 A1 | 5/2012 | Cuk | |
| 2012/0127766 A1 | 5/2012 | Crookes et al. | |
| 2012/0170338 A1 | 7/2012 | Trainer et al. | |
| 2012/0182771 A1 | 7/2012 | Trainer et al. | |
| 2012/0188803 A1 | 7/2012 | Trainer et al. | |
| 2012/0268099 A1 * | 10/2012 | Sihler | H02J 3/36 323/311 |
| 2013/0026841 A1 | 1/2013 | Hosini et al. | |
| 2013/0051105 A1 | 2/2013 | Wang et al. | |
| 2013/0094264 A1 | 4/2013 | Crookes et al. | |
| 2013/0119970 A1 | 5/2013 | Trainer et al. | |
| 2013/0128629 A1 | 5/2013 | Clare et al. | |
| 2013/0128636 A1 | 5/2013 | Trainer et al. | |
| 2013/0182467 A1 | 7/2013 | Cross et al. | |
| 2013/0194838 A1 | 8/2013 | Jang et al. | |
| 2013/0208521 A1 | 8/2013 | Trainer et al. | |
| 2013/0279211 A1 | 10/2013 | Green et al. | |
| 2014/0098575 A1 | 4/2014 | Whitehouse | |
| 2014/0133196 A1 | 5/2014 | Trainer | |
| 2014/0146583 A1 | 5/2014 | Trainer et al. | |
| 2014/0254205 A1 | 9/2014 | Trainer et al. | |
| 2014/0293656 A1 | 10/2014 | Trainer et al. | |
| 2014/0293668 A1 | 10/2014 | Trainer et al. | |
| 2014/0313797 A1 | 10/2014 | Davidson et al. | |

FOREIGN PATENT DOCUMENTS

| | | |
|---|---|---|
| DE | 195 35 552 | 4/1996 |
| DE | 10103031 | 7/2002 |
| DE | 101 03031 | * 7/2005 |
| DE | 10 2005 040 432 A1 | 3/2007 |
| DE | 10 2007 003172 | 2/2008 |
| DE | 10 2008 045247 | 3/2008 |
| DE | 10 2008 014 898 A1 | 9/2009 |
| DE | 10 2010 007 452 A1 | 8/2011 |
| EP | 0 867 998 B1 | 3/2007 |
| EP | 1 800 391 | 6/2007 |
| GB | 2 294 821 | 5/1996 |
| GB | 2 375 902 A | 11/2002 |
| GB | 2418079 | 3/2006 |
| JP | 2008-12531 0 | 5/2008 |
| WO | WO 97/02639 | 1/1997 |
| WO | WO 02/50972 A1 | 6/2002 |
| WO | WO 02/063758 | 8/2002 |
| WO | WO 03/055048 | 7/2003 |
| WO | WO 2007/023061 | 3/2007 |
| WO | WO 2007/028349 | 3/2007 |
| WO | WO 2007/028350 | 3/2007 |
| WO | WO 2007/033852 A1 | 3/2007 |
| WO | WO 2008/024038 | 2/2008 |
| WO | WO 2008/086760 | 7/2008 |
| WO | WO 2009/149743 | 12/2009 |
| WO | WO 2010/025758 | 3/2010 |
| WO | WO 2010/069371 | 6/2010 |
| WO | WO 2010/088969 | 8/2010 |
| WO | WO 2010/112523 | 10/2010 |
| WO | WO 2010/145688 | 12/2010 |
| WO | WO 2010/145689 | 12/2010 |
| WO | WO 2010/145690 | 12/2010 |
| WO | WO 2010/149200 | 12/2010 |
| WO | WO 2011/012171 | 2/2011 |
| WO | WO 2011/012174 | 2/2011 |

(56) References Cited

FOREIGN PATENT DOCUMENTS

| | | |
|---|---|---|
| WO | WO 2011/015227 | 2/2011 |
| WO | WO 2011/029480 A1 | 3/2011 |
| WO | WO 2011/044928 A1 | 4/2011 |
| WO | WO 2011/050847 | 5/2011 |
| WO | WO 2011/098117 | 8/2011 |
| WO | WO 2011/113471 | 9/2011 |
| WO | WO 2011/124258 | 10/2011 |
| WO | WO 2011/127980 | 10/2011 |
| WO | WO 2011/141054 A1 | 11/2011 |
| WO | WO 2011/157300 | 12/2011 |
| WO | WO 2012/013248 | 2/2012 |
| WO | WO 2012/025142 | 3/2012 |
| WO | WO 2012/167826 | 12/2012 |
| WO | WO 2013/000510 | 1/2013 |
| WO | WO 2013/071975 | 5/2013 |
| WO | WO 2013/017160 A1 | 7/2013 |
| WO | WO 2013/017177 A1 | 7/2013 |
| WO | WO 2013/127461 A1 | 9/2013 |
| WO | WO 2013/127462 A1 | 9/2013 |
| WO | WO 2013/127463 A1 | 9/2013 |

OTHER PUBLICATIONS

Baran, M. E. et al., "Overcurrent Protection in DC Zonal Shipboard Power Systems uisng Solid State Protection Devices", Electric Ship Technologies Symposium, 2007. ESTS '07. IEEE, IEEE, PI, May 1, 2007, pp. 221-224.

Davidson, C.C et al., "Innovative Concepts for Hybrid Multi-Level Converters for HVDC Power Transmission", 9th IET International Conference on AC and DC Power Transmission, ACDC 2010, Oct. 19-21, 2010, 5 pages.

Ertl, H et al., "A Constant Output Current Three-Phase Diode Bridge Rectifier Employing a Novel Electronic Smoothing Inductor", IEEE Transactions on Industrial Electronics,vol. 52, Issue 2, Apr. 1, 2005, pp. 454-461.

Flourentzou, Nikolas et al., "VSC-Based HVDC Power Transmission Systems: An Overview", IEEE Transactions on Power Electronics, vol. 24, No. 3, Mar. 2009, pp. 592-602.

Glinka M., "Prototype of Multi phase Modular-Multilevel-Converter with 2MW Power Rating and 17-Levei-Output-Voltage", 2004 35th Annual IEEE Power Electronics Specialists Conference, Jun. 20-25, 2004, pp. 2572-2576.

Guanjun Ding, et al., "New Technologies of Voltage Source Converter (VSC) for HVDC Transmission System Based on VSC", Power and Energy Society General Meeting—Conversion and Delivery of Electrical Energy in the 21st Century, 20081EEE, IEEE, Piscataway, NJ, USA, Jul. 20, 2008, p. 1-8.

Hagiwara, Makoto et al., "PWM Control and Experiment of Modular Multilevel Converters", Power Electronics Specialists Conference, PESC 2008, IEEE, Piscataway, NJ, USA, pp. 154-161, (2008).

Hongbo, Jiang, et al., "Harmonic Cancellation of a Hybrid Converter", High Power Electronics, The Royal Institute of Technology, Stockholm Sweden, IEEE Transactions on Power Delivery, vol. 13, No. 4, Oct. 1998, pp. 1291-1296.

Knudsen, L. et al., "Description and Prospective Applications of New Multi-Terminal HVDC System Concepts", CIGRE Conf. Internationale Des Grands Reseaux Electriques, Aug. 26-Sep. 1, 1990, pp. 1-11.

Lesnicar, A. et al., "A New Modular Voltage Source Inverter Topology", European Power Electronics Conference (EPE), Toulouse, France, Sep. 2-4, 2003, 10 pages.

Lesnicar, A. et al., "An Innovative Modular Multilevel Converter Topology Suitable for a Wide Power Range", Power Tech Conference Proceedings, Bologna, Italy, Jun. 23-26, 2003, Bologna, IEEE, vol. 3, 2003, 6 pages.

Liu, Y.H. et al., "A New High-Pulse Voltage-Sourced Converter for HVdc Transmission", IEEE Transactions on Power Delivery, vol. 18, No. 4, Oct. 2003, New Zealand, pp. 1388-1393.

Liu, Y.H. et al., "A New STATCOM Configuration Using Multi-Level DC Voltage Reinjection for High Power Application", IEEE Transactions on Power Delivery, vol. 19, No. 4, Oct. 2004, New Zealand, pp. 1828-1834.

Merlin, M.M.C. et al. "A New Hybrid Multi-Level Voltage-Source Converter With DC Fault Blocking Capability", 9th IET International Conference on AC and DC Power Transmission, ACDC 2010, Oct. 19-21, 2010, 5 pages.

Qahraman, B. et al., "A VSC Based Series Hybrid Converter for HVDC Transmission", Canadian Conference Electrical and Computer Engineering Conference, 2005, CCECE/CCGEI, Saskatoon, May 1-4, 2005, pp. 458-461.

Raju, N.R., "A DC Link-Modulated Three-Phase Converter", Industry Applications Conference, 2001. Thirty-Sixth IAS Annual Meeting, Chicago, IL, Sep. 30, 2001-Oct. 4, 2001. Conference Record of the 2001 IEEE, vol. 4 pp. 2181-2185.

Su, Gui-Jia et al., "Multilevel DC Link Inverter for Brush less Permanent Magnet Motors with Very Low Inductance", Industry Applications Conference, 2001. Thirty-Sixth IAS Annual Meeting, Chicago, IL, Sep. 30, 2001-Oct. 4, 2001. Conference Record of the 2001 IEEE , vol. 2, pp. 829-834.

Watkins, S.J. et al., "Multilevel Asymmetric Power Converters for Switched Reluctance Machines", International Conference on Power Electronics, Machines and Drives, Apr. 16-18, 2002, IEEE 2002, Conf. Publ. No. 487, pp. 195-200.

Wong, C. et al., "Feasibility Study of AC and DC-Side Active Filters for HDVC Converter Terminals", IEEE Transactions on Power Delivery, vol. 4, No. 4, Oct. 1989, New York, NY, USA, pp. 2067-2075.

Zhang, W. et al., "Active DC Filter for HVDC Systems", IEEE Computer Applications in Power, vol. 7, No. 1, Jan. 1994, New York, USA, pp. 40-44.

First Chinese Office Action in Application No. 2009801607004, mailed Jun. 25, 2014.

Notice of Allowance in U.S. Appl. No. 13/378,336, mailed on Jun. 13, 2014.

Notice of Allowance in U.S. Appl. No. 13/378,336, mailed on Feb. 6, 2014.

Notice of Allowance in U.S. Appl. No. 13/380,500, mailed on Jul. 31, 2013.

Notice of Allowance in U.S. Appl. No. 13/380,500, mailed on Jun. 11, 2013.

Notice of Allowance in U.S. Appl. No. 13/576,920, mailed on Jun. 9, 2014.

Notice of Allowance in U.S. Appl. No. 13/576,920, mailed on Dec. 4, 2013.

Notice of Allowance in U.S. Appl. No. 13/576,920, mailed on Mar. 20, 2014.

Notice of Allowance in U.S. Appl. No. 13/639,844, mailed on Sep. 8, 2014.

Notice of Allowance in U.S. Appl. No. 13/640,468, mailed on Jun. 4, 2014.

Notice of Allowance in U.S. Appl. No. 13/813,414, mailed on Jun. 2, 2014.

Notice of Allowance in U.S. Appl. No. 13/818,654, mailed on May 30, 2014.

Office Action in U.S. Appl. No. 13/388,277, mailed on Jul. 3, 2014.

Office Action in U.S. Appl. No. 13/388,277, mailed on Nov. 22, 2013.

Office Action in U.S. Appl. No. 13/634,205, mailed on Sep. 22, 2014.

Office Action in U.S. Appl. No. 13/639,844, mailed on May 22, 2014.

PCT International Preliminary Report on Patentability in International Application No. PCT/EP2009/057736, mailed on Nov. 24, 2011.

PCT International Preliminary Report on Patentability in International Application No. PCT/EP2009/059973, mailed on Oct. 5, 2011.

PCT International Preliminary Report on Patentability in International Application No. PCT/EP2009/057388, mailed on Dec. 14, 2011.

(56) References Cited

OTHER PUBLICATIONS

PCT International Preliminary Report on Patentability in International Application No. PCT/EP2010/054974, mailed on Aug. 10, 2012.
PCT International Preliminary Report on Patentability in International Application No. PCT/EP2010/054660, mailed on Jun. 6, 2012.
PCT International Preliminary Report on Patentability in International Application No. PCT/EP2010/053290, mailed on Apr. 20, 2012.
PCT International Preliminary Report on Patentability in International Application No. PCT/EP2010/051572, mailed on Apr. 20, 2012.
PCT International Preliminary Report on Patentability in International Application No. PCT/EP2011/070402, mailed on Feb. 18, 2014.
PCT International Preliminary Report on Patentability in International Application No. PCT/EP2010/058630, mailed on Dec. 19, 2012.
PCT International Preliminary Report on Patentability in International Application No. PCT/EP2010/061145, mailed on Aug. 20, 2012.
PCT International Preliminary Report on Patentability in International Application No. PCT/EP2010/62316, mailed on Mar. 7, 2013.
PCT International Preliminary Report on Patentability in International Application No. PCT/EP2011/063207, mailed on Apr. 2, 2014.
PCT International Preliminary Report on Patentability in International Application No. PCT/EP2011/064545, mailed May 19, 2014.
PCT International Preliminary Report on Patentability in International Application No. PCT/EP2011/059514, mailed on Aug. 1, 2013.
PCT International Preliminary Report on Patentability in International Application No. PCT/EP2011/060907, mailed on Sep. 24, 2013.
PCT International Preliminary Report on Patentability in International Application No. PCT/EP2012/053571, mailed on Sep. 12, 2014.
PCT International Preliminary Report on Patentability in International Application No. PCT/EP2012/053574, mailed on Jul. 21, 2014.
PCT International Preliminary Report on Patentability in International Application No. PCT/EP2012/053573, mailed on Jul. 21, 2014.
PCT International Search Report and Written Opinion for Application No. PCT/EP2010/061145, mailed on Jun. 5, 2011.
PCT International Search Report and Written Opinion in International Application No. PCT/EP2010/054660, mailed on Feb. 24, 2011.
PCT International Search Report and Written Opinion in International Application No. PCT/EP2009/057736, mailed on Mar. 26, 2010.
PCT International Search Report and Written Opinion in International Application No. PCT/EP2010/62316, mailed on Jul. 6, 2011.
PCT International Search Report and Written Opinion in International Application No. PCT/EP2010/058630, mailed on Apr. 19, 2011.
PCT International Search Report and Written Opinion in International Application No. PCT/EP2011/059514, mailed on Jul. 5, 2012.
PCT International Search Report and Written Opinion in International Application No. PCT/EP2011/060907, mailed on Jul. 16, 2012.
PCT International Search Report and Written Opinion in International Application No. PCT/EP2010/053290, mailed on Feb. 11, 2011.
PCT International Search Report and Written Opinion in International Application No. PCT/EP2010/051572, mailed on Jan. 19, 2011.
PCT International Search Report and Written Opinion in International Application No. PCT/EP2009/057388, mailed on Mar. 18, 2010.
PCT International Search Report and Written Opinion in International Application No. PCT/EP2009/057736, mailed on Mar. 16, 2010.
PCT International Search Report and Written Opinion in International Application No. PCT/EP2009/059973, mailed on Aug. 13, 2010.
PCT International Search Report and Written Opinion in International Application No. PCT/EP2011/063207, mailed May 30, 2012.
PCT International Search Report and Written Opinion in International Application No. PCT/EP2011/064545, mailed Jun. 11, 2012.
PCT International Search Report and Written Opinion in International Application No. PCT/EP2012/053571, mailed on Jun. 20, 2012.
PCT International Search Report and Written Opinion in International Application No. PCT/EP2012/053574, mailed on Nov. 20, 2012.
PCT International Search Report and Written Opinion in International Application No. PCT/EP2012/053573, mailed on Dec. 4, 2012.
PCT International Search Report for International Application No. PCT/EP2010/054974, mailed on Mar. 4, 2011.
PCT International Search Report in International Application No. PCT/EP2011/070402, mailed on Sep. 27, 2012.
U.S. Appl. No. 13/576,920, filed Aug. 2, 2012.
U.S. Appl. No. 13/639,844, filed Oct. 5, 2012.
U.S. Appl. No. 14/129,923, filed Dec. 27, 2013.
U.S. Appl. No. 14/357,908, filed May 13, 2014.
U.S. Appl. No. 14/379,746, filed Aug. 28, 2014.
U.S. Appl. No. 14/381,570, filed Aug. 27, 2014.

* cited by examiner

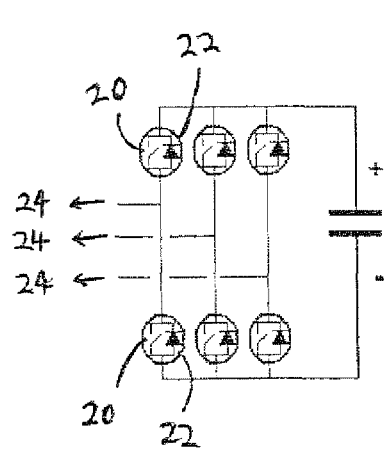
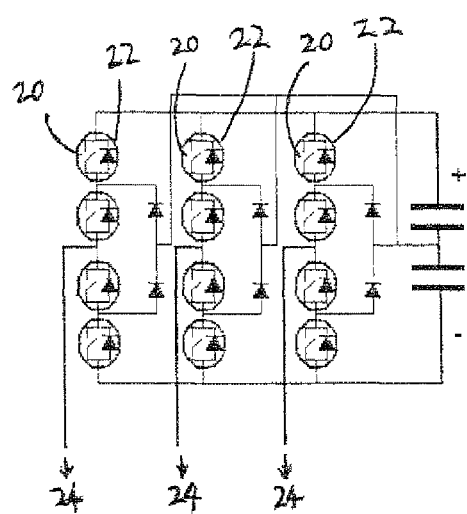
Figure 1A  Figure 1B
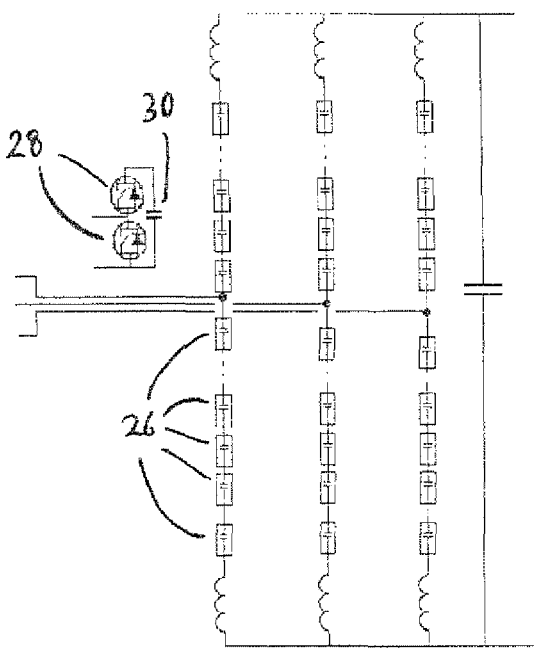
Figure 2

CONVERTER FOR HVDC TRANSMISSION AND REACTIVE POWER COMPENSATION

CROSS-REFERENCE TO RELATED APPLICATIONS

This application is a continuation application of U.S. patent application Ser. No. 13/805,333 filed Feb. 14, 2013, which is a 371 National Stage application of International Application No. PCT/EP2010/058630 filed Jun. 18, 2010, the entire contents of which are incorporated herein by reference.

BACKGROUND OF THE INVENTION

This invention relates to a power electronic converter for use in high voltage direct current (HVDC) power transmission and reactive power compensation.

In power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost effective when power needs to be transmitted over a long distance.

The conversion of AC to DC power is also utilized in power transmission networks where it is necessary to interconnect AC networks operating at different frequencies.

In any such power transmission network, converters are required at each interface between AC and DC power to effect the required conversion, and one such form of converter is a voltage source converter (VSC).

An example of a voltage source converter is the use of six-switch (two-level) and three-level multilevel converter topologies with insulated gate bipolar transistors (IGBT) 20, as shown in FIGS. 1A and 1B. The IGBT devices 20 are connected and switched together in series to enable high power ratings of 10's to 100's of MW to be realized.

This conventional approach requires a complex and active IGBT drive, and may require large passive snubber components to ensure that the high voltage across the series strings of IGBT devices 20 shares properly during converter switching. In addition, the IGBT devices 20 need to switch on and off several times at high voltage over each cycle of the AC supply frequency to control the harmonic currents being fed to the AC network 24.

Another example of a voltage source converter lies in a multilevel converter arrangement which is shown in FIG. 2. In the conventional multilevel converter, converter bridges or cells 26 are connected in series, each cell 26 being switched at a different time. Each cell 26 includes a pair of semiconductor switches 28 connected in parallel with a capacitor 30 in a half bridge arrangement to define a 2-quadrant unipolar module that can develop zero or positive voltage and can conduct current in both directions. The conventional multilevel converter arrangement eliminates the problems associated with the direct switching of series connected IGBT devices, because the individual bridge cells 26 do not switch simultaneously and converter voltage steps are comparatively small.

During operation of HVDC power transmission networks, voltage source converters may however be vulnerable to DC side faults that present a short circuit with low impedance across the DC power transmission lines or cables. Such faults can occur due to damage or breakdown of insulation, movement of conductors or other accidental bridging between conductors by a foreign object.

The presence of low impedance across the DC power transmission lines or cables is detrimental to a voltage source converter because it can cause current flowing in the voltage source converter to increase to a fault current level many times above its original value. In circumstances where the voltage source converter was only designed to tolerate levels of current below the level of the fault current, such a high fault current damages components of the voltage source converter.

Conventionally, in order to reduce the risk posed by a short circuit to a device, one or more switches would be opened to switch the device out of circuit. However the switching elements of voltage source converters, such as the voltage source converter shown in FIG. 1A, typically include anti-parallel diodes 22 that remain in conduction when the insulated gate bipolar transistors 20 are opened. Consequently, even when the insulated gate bipolar transistors 20 are opened, the diodes 22 allow the fault current 32 arising from a short circuit 34 in a DC network 36 connected to the voltage source converter to flow continuously through the converter, as shown in FIG. 3.

Another option for reducing the risk posed to a voltage source converter by a short circuit is to design the voltage source converter to tolerate the resultant fault current so that there is sufficient time to detect the fault and extinguish the current by opening a circuit breaker on the other, AC side of the voltage source converter.

However the fault current arising from a short circuit in a DC network connected to the voltage source converter is typically many times greater than the rated value of the converter. In order to increase the tolerance of the voltage source converter, either the size and capacity of conducting converter diodes must be increased, several converter diodes must be connected in parallel or a fast-acting bypass device must be incorporated that is capable of carrying the high fault current. In any case, whichever option is pursued, additional inductive components are almost certainly required to limit the high fault current and the increase in components leads to an increase in converter size and weight. This in turn leads to an increase in the size and area of the associated HVDC converter station.

In addition, opening a circuit breaker on the opposite, non-faulty side of the voltage source converter is disadvantageous because it disconnects the other network from the HVDC power transmission network. Consequently after the fault is repaired, the converter station must go through a start-up sequence and a series of checks before the other network can be reconnected to the HVDC power transmission network. This leads to a prolonged interruption of power flow and therefore non-availability of the power transmission scheme to those dependent on the scheme for electrical power supply.

A further option is to open a circuit breaker on the DC side of the voltage source converter to allow the fault in the DC network to be isolated and repaired. However, the non-zero direct current flowing in the voltage source converter results in the formation of a sustained power arc when conventional mechanical circuit breaking contacts are used. It is therefore necessary to use expensive, specialized DC circuit breaking equipment to interrupt the DC side fault current, which leads to an increase in converter, size, weight and cost.

SUMMARY OF THE INVENTION

According to a first aspect of the invention, there is provided a power electronic converter for use in high voltage direct current power transmission and reactive power compensation comprising a plurality of switching elements interconnecting in use a DC network and one or more AC networks, the plurality of switching elements being controllable in use to facilitate power conversion between the AC and DC networks, wherein in use, the plurality of switching elements are controllable to form one or more short circuits within the power electronic converter so as to define one or more primary current flow paths, the or each primary current flow path including a respective one of the AC networks and the power electronic converter and bypassing the DC network.

The provision of switching elements controlled in this manner minimizes the current flowing into and out of the DC network during the occurrence of a fault in the DC network resulting in high fault current in the power electronic converter. This in turn allows isolation of the fault in the DC network at near zero current, which prevents the formation of a sustained power arc and allows the use of standard AC side circuit breakers instead of expensive, specialized DC circuit breakers.

In addition the formation of the or each current flow path means that it is not necessary to open a circuit breaker on the non-faulty AC side of the voltage source converter to disconnect the non-faulty AC electrical network from the voltage source converter. Consequently, once the DC side fault is repaired, normal operation of the voltage source converter may be resumed without the need for a startup sequence and series of checks.

Furthermore the use of the power electronic converter components to carry out both voltage conversion and isolation of the DC side fault may minimize or eliminate the need for separate protective circuit equipment, such as a crow bar circuit. This leads to savings in terms of hardware size, weight and costs.

In embodiments of the invention, the power electronic converter may further include a plurality of converter limbs, each converter limb including first and second DC terminals for connection in use to the DC network and an AC terminal for connection in use to an AC network, each converter limb defining first and second limb portions, each limb portion including an electronic block connected in series between a respective one of the first and second DC terminals and the respective AC terminal, each electronic block including at least one switching element, the or each switching element of each electronic block being controllable in use to switch the respective limb portion in and out of circuit to facilitate the AC to DC power conversion process.

In such embodiments, each electronic block may include at least one primary switching element, the or each primary switching element being connected in series between the respective one of the first and second DC terminals and the respective AC terminal. These arrangements are suitable for carrying out rectification and inversion processes to facilitate power conversion between the AC and DC networks.

In embodiments employing the use of at least one primary switching element, the primary switching elements of the first and/or second limb portions, may be controllable in use to turn on simultaneously or separately so as to be concurrently in on-states.

The formation of the or each short circuit in this manner results in the majority of the current circulating within the AC network and the converter limbs of the power electronic converter and thereby limits the level of current flowing through the DC network.

Additionally, turning on the primary switching elements of both limb portions to be concurrently in on-states allows the fault current to be shared between the primary switching elements of both limb portions and thereby effectively halving the fault current flowing through each limb portion. This minimizes the risk of damage to the primary switching elements of the limb portions and allows the use of lower-rated switching elements.

In such embodiments, the primary switching elements of the first and/or second limb portions are controllable in use to turn off simultaneously or separately so as to switch from being concurrently in on-states to being concurrently in off-states.

The primary switching elements may be turned off to remove the or each short circuit after the DC side fault has been isolated and repaired so as to resume normal operation of the power electronic converter.

In other embodiments employing the use of a plurality of converter limbs, each electronic block may further include at least one chain-link converter.

The structure of the chain-link converter allows the build-up of a combined voltage, which is higher than the voltage provided by an individual module, via the insertion of multiple modules, each providing a voltage, into the chain-link converter. By varying the value of the combined voltage, the chain link converter may be operated to generate a voltage waveform of variable amplitude and phase angle.

Each electronic block may include at least one primary switching element connected in series with the or each chain-link converter.

The series combination of one or more primary switching elements connected in series with the or each chain-link converter in each limb portion to switch the limb portion in and out of circuit between the respective DC terminal and the AC terminal is advantageous because it reduces the voltage range that each chain-link converter would be required to generate. This in turn allows the number of components in each chain-link converter to be minimized.

In other embodiments, the power electronic converter may include at least one phase element, the phase element including two parallel-connected sets of series-connected switching elements to interconnect in use an AC voltage and a DC voltage, a junction between the series-connected switching elements of each parallel-connected set defining an AC terminal for connection to the AC network.

In such embodiments, the power electronic converter may include a plurality of phase elements, the AC terminals of each phase element being connected in use to a respective phase of a multi-phase AC network.

In such a voltage source converter, the series connection of the switching elements and chain-link converters of each converter limb operates independently of that of the other converter limbs and therefore only directly affects the phase connected to the respective AC terminal, and has minimal influence on the phases connected to the AC terminals of the other converter limbs.

In embodiments involving the use of at least one phase element, the series-connected switching elements of the or each phase element may be controllable in use to turn on simultaneously or separately so as to be concurrently in on-states. In such embodiments, the series-connected switching elements of each phase element may be controllable in use so that the series-connected switching elements of one of the phase elements switch to being concurrently in on-states at the same time as or separately from the series-connected switching elements of the other phase elements.

The formation of the or each short circuit in this manner results in the majority of the current circulating within the AC network and the or each phase element and thereby limits the level of current flowing through the DC network.

Preferably the series-connected switching elements of the or each phase element are controllable in use to turn off simultaneously or separately so as to switch from being concurrently in on-states to being concurrently in off-states. In such embodiments in which the power electronic converter includes a plurality of phase elements, the series-connected switching elements of each phase element may be controllable in use so that the series-connected switching elements of one of the phase elements switch from being concurrently in on-states to being concurrently in off-states at the same time as or separately from the series-connected switching elements of the other phase elements.

The series-connected switching elements of the or each phase element may be turned off to remove the or each short circuit after the DC side fault has been isolated and repaired so as to resume normal operation of the power electronic converter.

In other embodiments employing the use of at least one phase element, the power electronic converter may further include at least one auxiliary converter to act as a waveform synthesizer to modify a DC voltage presented to the DC side of the or each phase element.

The provision of an auxiliary converter allows shaping of the DC voltage for transfer to the AC side. In the absence of the one or more auxiliary converters to modify the DC voltage presented to the DC side of the or each phase element, the constant DC side voltage would produce a square wave voltage on the AC side of the or each phase element, with significant harmonic components and hard switching of the semiconductor devices. The provision of the one or more auxiliary converters however allows the production of a more desirable AC waveform with less harmonic distortion.

In such embodiments, an auxiliary converter may be connected in parallel or series with the or each phase element, the or each phase element and the respective auxiliary converter forming a single phase converter limb.

Regardless of whether the auxiliary converter is connected in series or in parallel with the or each phase element in each single phase converter limb, a multi-phase voltage source converter may be constructed by connecting a plurality of converter limbs in series or in parallel on the DC side of the circuit to define a two terminal DC network for multi-phase electrical power transmission.

The or each auxiliary converter may be a chain-link converter.

In embodiments employing the use of at least one chain-link converter, the or each chain-link converter may include a chain of modules connected in series, each module including at least one pair of secondary switching elements connected in parallel with an energy storage device, the secondary switching elements being controllable in use such that the chain of modules connected in series provides a stepped variable voltage source.

To define a 2-quadrant unipolar module that can provide zero or positive voltage and can conduct current in two directions, each module may include a pair of secondary switching elements connected in parallel with an energy storage device in a half-bridge arrangement.

To define a 4-quadrant bipolar module that can provide zero, negative or positive voltage and can conduct current in two directions, each module may include two pairs of secondary switching elements connected in parallel with an energy storage device in a full-bridge arrangement.

In such embodiments in which the power electronic converter includes a plurality of converter limbs, the secondary switching elements of each module may be controllable in use so that the chain-link converters of the first and/or second limb portions concurrently provide zero voltage.

This allows the formation of a short circuit in each limb portion having one or more chain-link converters so to define the or each current flow path. The or each energy storage device is preferably a capacitor, fuel cell, photovoltaic cell, battery or an auxiliary AC generator with an associated rectifier.

Such flexibility is useful in the design of converter stations in different locations where the availability of equipment may vary due to locality and transport difficulties. For example, the energy storage device of each module on an offshore wind farm may be provided in the form of an auxiliary AC generator connected to a wind turbine.

Preferably each switching element includes a semiconductor device, which may be an insulated gate bipolar transistor, a gate turn-off thyristor, a field effect transistor, an insulated gate commutated thyristor or an integrated gate commutated thyristor.

The semiconductor device in each switching element is preferably connected in parallel with an anti-parallel diode.

The use of semiconductor devices is advantageous because such devices are small in size and weight and have relatively low power dissipation, which minimizes the need for cooling equipment. It therefore leads to significant reductions in power converter cost, size and weight.

The fast switching capabilities of such semiconductor devices allow the switching elements to synthesize complex waveforms for injection into the AC side and/or DC side of the voltage source converter. The injection of such complex waveforms can be used, for example, to minimize the levels of harmonic distortion typically associated with thyristor-based voltage source converters. Furthermore the inclusion of such semiconductor devices allows the voltage source converter to respond quickly to the development of DC side faults and/or other abnormal operating conditions, and thereby improve fault protection of the voltage source converter.

Preferably, when the switching elements are controllable in use to turn off so as to be concurrently turned off, each switching element is controllable in use to turn off at a predetermined level of current flowing through the respective switching element. This predetermined level of current may be below the peak value of the current flowing through the respective switching element and/or may be zero current.

Soft switching of each switching element at low or zero current minimizes the switching losses in the respective switching element and thereby improves the overall efficiency of the power electronic converter.

According to a second aspect of the invention, there is provided a method of operating a power electronic converter according to any preceding claim, the method comprising the step of, upon detection of a fault in the DC network, controlling the plurality of switching elements to form one or more short circuits within the power electronic converter so as to define one or more current flow paths, the or each current flow path including a respective one of the AC networks and the power electronic converter and bypassing the DC network.

In embodiments of the invention, the method may further include the step of isolating the fault in the DC network after formation of the or each short circuit. In such embodiments, the fault in the DC network is isolated using one or more isolators and/or one or more circuit breakers.

Preferably the method further includes the step of controlling the switching elements to remove the or each short circuit after isolating the fault in the DC network.

In other embodiments, the method may further include the step of, upon detection of a fault in the DC network, forming one or more auxiliary short-circuits to define one or more auxiliary current flow paths including a respective one of the AC networks and bypassing the power electronic converter and the DC network. In such embodiments, the or each auxiliary short circuit may be formed across two or more phases of the AC network, preferably by controlling at least one external crowbar circuit, the or each crowbar circuit including one or more mechanical or semiconductor switches.

The provision of the or each auxiliary current flow path not only allows the fault current to be shared between the primary and auxiliary current flow paths, but also improves the speed of operation when the or each auxiliary current flow path is formed with the help of mechanical switching.

Other advantageous features of the invention are recited in claims 31 to 33 and 37 to 42.

BRIEF DESCRIPTION OF THE DRAWINGS

Preferred embodiments of the invention will now be described, by way of non-limiting examples, with reference to the accompanying drawings in which:

FIGS. 1A, 1B and 2 show prior art voltage source converters;

DETAILED DESCRIPTION OF PARTICULAR EMBODIMENTS OF THE INVENTION

Figure 3:
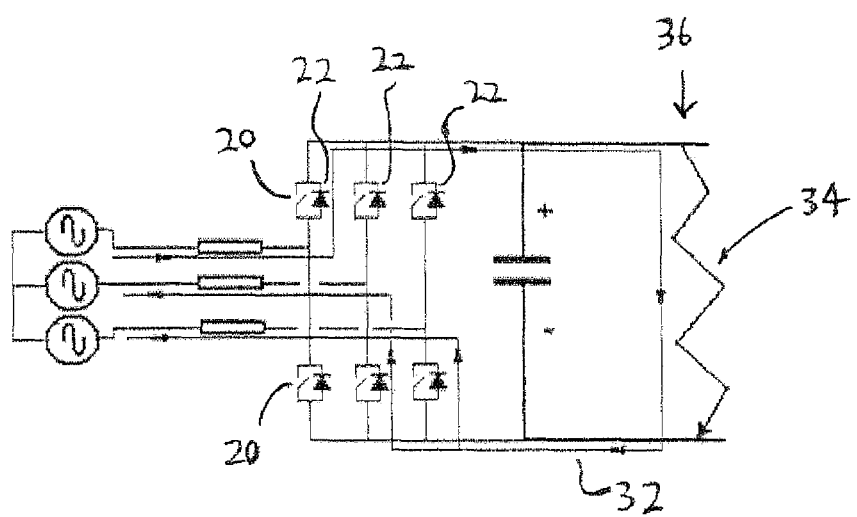
FIG. 3 shows the flow of fault current in the converter of FIG. 1A during the occurrence of a fault in the DC network.
Figure 4A:
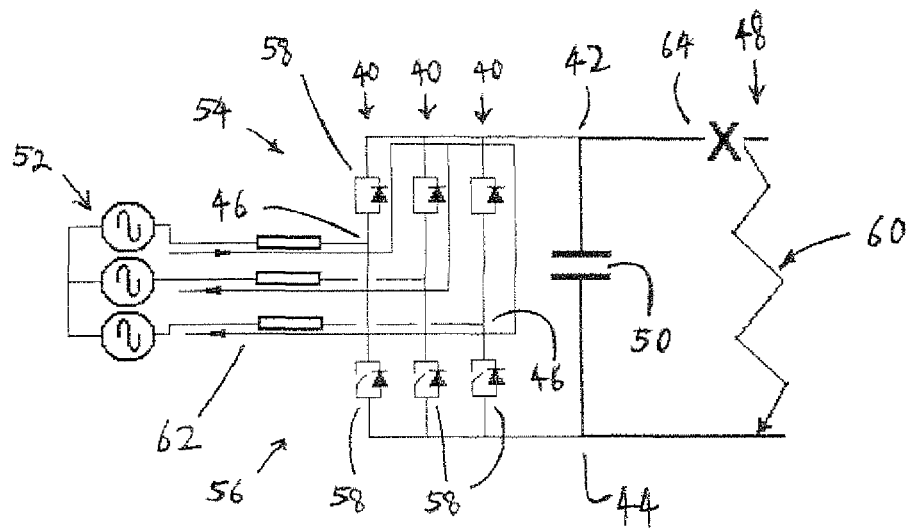
FIGS. 4a, 4b and 4c show the operation of a first embodiment of the power electronic converter to minimize fault current flow into and out of the DC network.
Figure 4B:
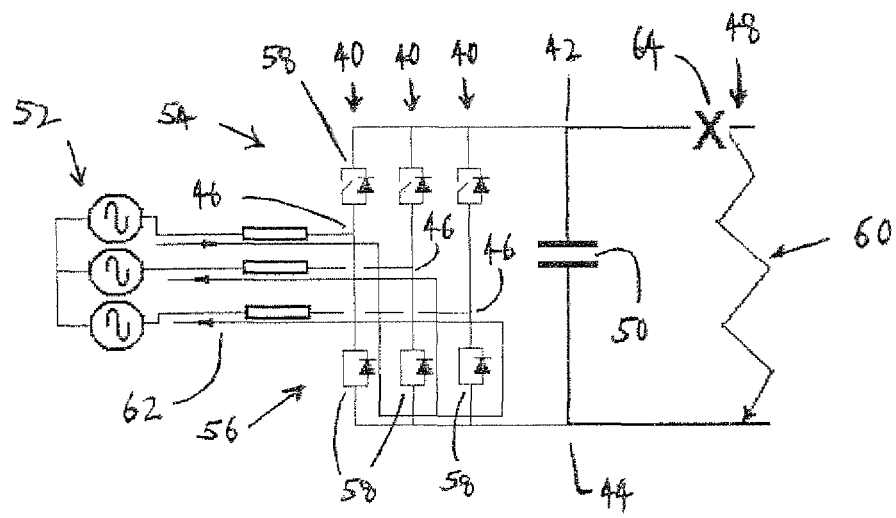
Figure 4C:
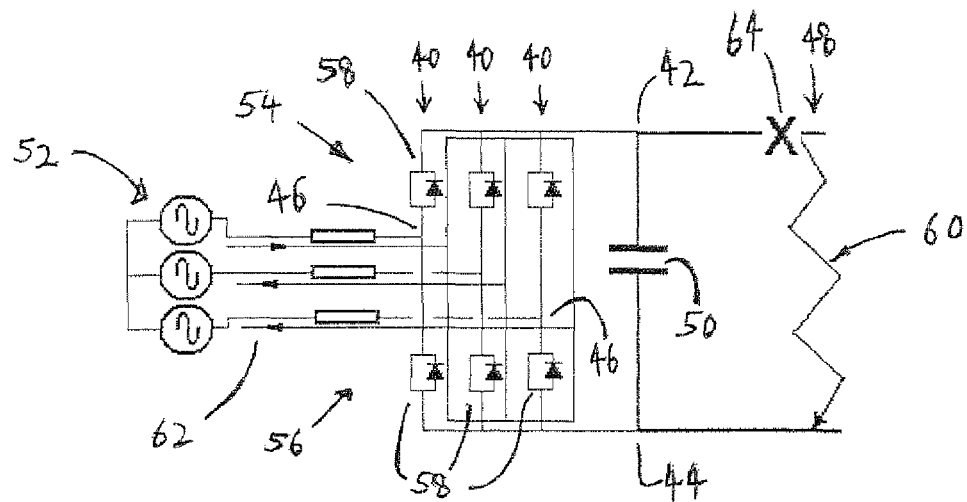

A first embodiment of the power electronic converter comprises a plurality of converter limbs 40, as shown in FIGS. 4a to 4c. Each converter limb 40 includes first and second DC terminals 42, 44 and an AC terminal 46.

In use, the first DC terminal 42 of each converter limb 40 is connected to a positive terminal of a DC network 48 which carries a voltage of $+V_{DC}/2$, where $V_{DC}$ is the DC voltage range of the DC network 48 while the second DC terminal 44 of each converter limb 40 is connected to a negative terminal of a DC network 48 which carries a voltage of $-V_{DC}/2$. It is envisaged that in other embodiments, the first and second DC terminals of each converter limb may be respectively connected to negative and positive terminals of the DC network.

A DC link capacitor 50 is connected in series between the first and second DC terminals 42, 44 and in parallel with each converter limb 40.

In use, each AC terminal 46 is connected to a respective phase of a three-phase AC network 52. In other embodiments, it is envisaged that each AC terminal may be connected to one or more transformers and/or one or more inductors.

Each converter limb 40 includes first and second limb portions 54, 56, each limb portion 54, 56 including an electronic block connected in series between a respective one of the first and second DC terminals 42, 44 and the respective AC terminal 46. Each electronic block includes a primary switching element 58, the primary switching element 58 of each electronic block being controllable in use to switch the respective limb portion 54, 56 in and out of circuit to facilitate the AC to DC power conversion process.

In other embodiments, each electronic block may include a plurality of primary switching elements connected in series instead of the single primary switching element. This allows the voltage across the respective electronic block to be shared among the plurality of primary switching elements and thereby allow the use of primary switching elements with low current ratings.

Each primary switching element 56 includes an insulated gate bipolar transistor connected in parallel with an anti-parallel diode. The primary switching elements 58 of the plurality of converter limbs 40 are controllable in use to turn on and off in sequence to carry out rectification and/or inversion processes so as to facilitate power conversion between the AC and DC networks 52, 48.

In the event of a fault 60 in the DC network 48 resulting in high fault current 62 in the power electronic converter, the primary switching elements 58 of the first and/or second limb portions 54, 56 are controllable in use to turn on so as to be concurrently in on-states.

As shown in FIGS. 4a, 4b and 4c, turning on the primary switching elements 58 of the first and/or second limb portions 54, 56 so as to be concurrently in on-states leads to the formation of a plurality of primary current flow paths including the respective phases of the AC network 52 and the first and/or second limb portions 54, 56 of the converter limbs 40 and bypassing the DC network 48. Consequently the majority of the fault current 62 circulates within the AC network 52 and the first and/or second limb portions 54, 56, i.e. the current flows from the AC network 52 into the AC terminals 46 of the converter limbs 40, through the first and/or second limb portions 54, 56 and back into the AC network 52 via the AC terminals 46.

When the current flow paths include the first and second limb portions 54, 56 of each converter limb, as shown in FIG. 4c, the fault current 62 flowing through each limb portion 54, 56 is effectively halved. This minimizes the risk of failure of the primary switching elements 58 of the first and second limb portions 54, 56 and allows the use of lower-rated primary switching elements 58.

The primary switching elements 58 of the first and/or second limb portions 54, 56 may be turned on simultaneously or separately so as to be concurrently in on-states.

Operation of the primary switching elements 58 in this manner reduces the amount of current flowing through the DC network 48 to near zero current, which allows the fault 60 in the DC network 48 to be isolated from the power electronic converter.

Isolation of the fault 60 may be carried out using an isolator or circuit breaker 64 such as standard AC side circuit breakers normally used for circuit breaking at zero current.

After the fault 60 in the DC network 48 has been isolated and repaired, the primary switching elements 58 of the first and/or second limb portions 54, 56 are controllable in use to turn off simultaneously or separately so as to switch from being concurrently in on-states to being concurrently in off-states.

This removes the short circuits and therefore the primary current flow paths in the converter limbs 40 and thereby allows resumption of normal operation of the power electronic converter.

In a second embodiment of the power electronic converter, the power electronic converter is exactly the same as the power electronic converter in FIGS. 4a, 4b and 4c except that each electronic block includes a chain-link converter. In such embodiments, the single chain-link converter in each electronic block may be replaced by a plurality of chain-link converters.

Each chain-link converter includes a chain of modules connected in series, each module including at least one pair of secondary switching elements connected in parallel with a capacitor. The secondary switching elements of each module are operable so that the chain of modules provides a stepped variable voltage source, and are switched at near to the fundamental frequency of the AC network.

The number of modules in each chain-link converter is determined by the required voltage rating of the voltage source converter.

In embodiments employing the use of one or more chain-link converters, each module may include a pair of secondary switching elements connected in parallel with a capacitor in a half-bridge arrangement to define a 2-quadrant unipolar module that can provide zero or positive voltage and can conduct current in two directions.

In embodiments employing the use of one or more chain-link converters, each module includes two pairs of secondary switching elements connected in parallel with a capacitor in a full-bridge arrangement to define a 4-quadrant bipolar module that can provide zero, negative or positive voltage and can conduct current in two directions.

It is envisaged that in other embodiments, the capacitor of each of the modules may be replaced by a different energy storage device such as a fuel cell, a battery, a photovoltaic cell or an auxiliary AC generator with an associated rectifier.

Such flexibility is useful in the design of converter stations in different locations where the availability of equipment may vary due to locality and transport difficulties. For example, the energy storage device of each module on an offshore wind farm may be provided in the form of an auxiliary AC generator connected to a wind turbine.

The capacitor of each module may be bypassed or inserted into the respective chain-link converter by changing the state of the secondary switching elements.

A capacitor of a module is bypassed when a pair of secondary switching elements is configured to form a short circuit in the module, causing the current in the voltage source converter to pass through the short circuit and bypass the capacitor.

A capacitor of a module is inserted into the chain-link converter when a pair of secondary switching elements is configured to allow the converter current to flow into and out of the capacitor, which is then able to charge or to discharge its stored energy and provide a voltage. In 4-quadrant bipolar modules, the capacitor may be inserted in either direction so as to provide a positive or negative voltage.

It is therefore possible to build up a combined voltage across the chain-link converter which is higher than the voltage available from each of individual modules via the insertion of the capacitors of multiple modules, each providing its own voltage, into the chain-link converter.

Figure 5:
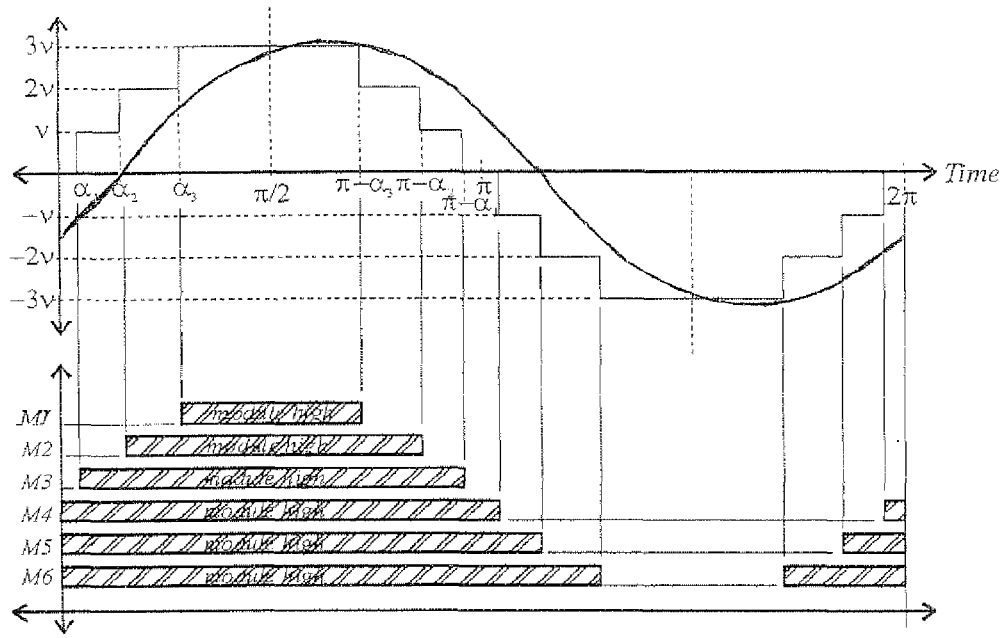
FIG. 5 shows the synthesis of a 50z sinusoidal waveform using a chain-link converter.

It is also possible to vary the timing of switching operations for each module such that the insertion and/or bypass of the capacitors of individual modules in the chain-link converter results in the generation of a voltage waveform. An example of a voltage waveform generated using the chain-link converter is shown in FIG. 5, in which the insertion of the capacitors of the individual modules is staggered to generate a 50 Hz sinusoidal waveform. Other waveform shapes may be generated by adjusting the timing of switching operations for each module in the chain-link converter.

Each secondary switching element includes an insulated gate bipolar transistor accompanied by a reverse-parallel connected diode.

In other embodiments it is envisaged that each switching element may include a different semiconductor switch, such as a gate turn-off thyristor, a field effect transistor, an insulated gate commutated thyristor, an integrated gate commutated thyristor or other force-commutated or self-commutated 30 semiconductor devices, preferably connected in parallel with an anti-parallel diode.

The use of semiconductor devices is advantageous because such devices are small in size and weight and have relatively low power dissipation, which minimizes the need for cooling equipment. It therefore leads to significant reductions in power converter cost, size and weight.

The fast switching capabilities of such semiconductor devices allow the switching elements to synthesize complex waveforms for injection into the AC side and/or DC side of the voltage source converter. The injection of such complex waveforms can be used, for example, to minimize the levels of harmonic distortion typically associated with thyristor-based voltage source converters. Furthermore the inclusion of such semiconductor devices allows the voltage source converter to respond quickly to the development of DC side faults and/or other abnormal operating conditions, and thereby improve fault protection of the voltage source converter.

In use the chain-link converters of the first and second limb portions are operable to switch each of the chain-link converters in and out of circuit between the respective DC terminal, and the AC terminal. The chain-link converters are suitable to generate a voltage waveform at the AC terminal due to their ability to provide voltage steps to increase or decrease the output voltage at the AC terminal.

In the event of a fault in the DC network resulting in high fault current in the power electronic converter, the secondary switching elements of each module are controllable in use so that the chain-link converters of the first and/or second limb portions concurrently provide zero voltage. This leads to the formation of a plurality of primary current flow paths including the respective phases of the AC network and the first and/or second limb portions of the converter limbs and bypassing the DC network. Consequently the majority of the fault current circulates within the AC network and the first and/or second limb portions i.e. the current flows from the AC network into the AC terminals of the converter limbs, through the first and/or second limb portions and back into the AC network via the AC terminals.

Similarly to the operation of the first embodiment of the power electronic converter, operation of the secondary switching elements in this manner reduces the amount of current flowing through the DC network to near zero current, which allows the fault in the DC network to be isolated from the power electronic converter, and isolation of the fault may be carried out using an isolator or circuit breaker such as standard AC side circuit breakers normally used for circuit breaking at zero current.

After the fault in the DC network has been isolated and repaired, the secondary switching elements of each module are controllable in use so that the chain-link converters of the first and/or second limb portions switch from concurrently providing zero voltage to concurrently providing positive voltage so as to offset the voltage difference between the respective DC and AC terminals. This removes the short circuits and therefore the primary current flow paths in the converter limbs and thereby allows resumption of normal operation of the power electronic converter.

Figure 6:
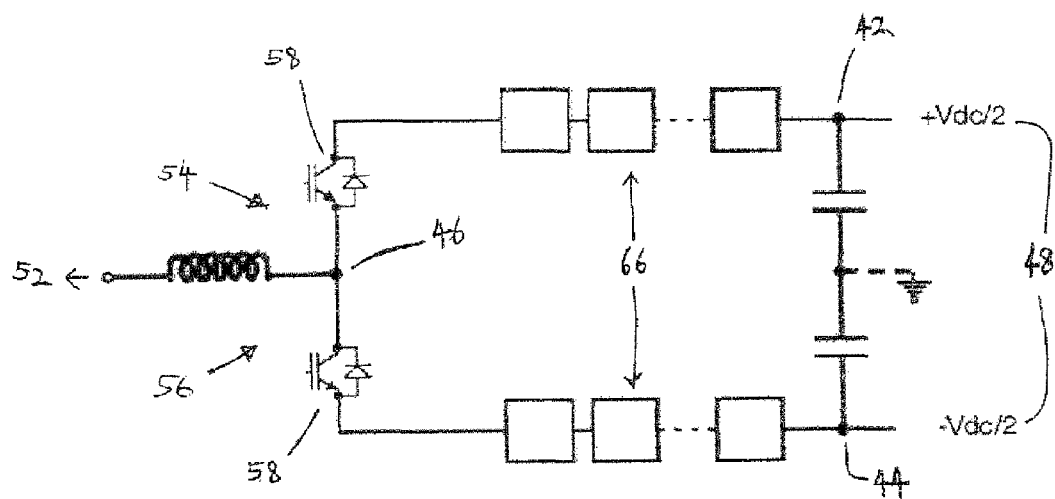
FIG. 6 shows a power electronic converter according to a third embodiment of the invention.

A third embodiment of the power electronic converter is shown in FIG. 6. Each electronic block includes a primary switching element 58 connected in series with a chain-link converter 66. In FIG. 6, the primary switching element 58 of each of the first and second limb portions 54, 56 is connected to the AC terminal 46, which is connected in use to an AC network 52, and the chain-link converter 66 of each of the first and second limb portions 54, 56 is connected to the respective DC terminal 42, 44, which is connected in use to a DC network 48.

The series connection between the primary switching element 58 and the chain-link converter of each of the first and second limb portions means that, in other embodiments, they may be connected in a reverse order between the AC terminal and the respective DC terminal.

It is also envisaged that in other embodiments, the arrangement and number of primary switching elements and chain-link converters in each electronic block of each limb portion may vary depending on the voltage requirements of the power electronic converter.

In embodiments in which the electronic block includes at least one primary switching element and at least one chain-link converter, the short circuits may be formed in use by controlling the or each primary switching elements and the or each chain-link converter in the manner outlined above so as to define the primary current flow paths.

Figure 7:
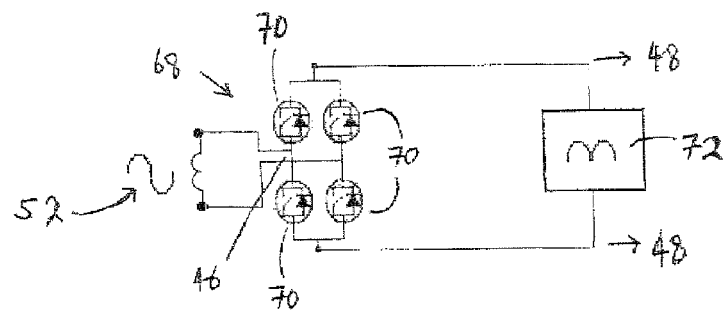
FIG. 7 shows a power electronic converter according to a fourth embodiment of the invention.

A power electronic converter according to a fourth embodiment of the invention is shown in FIG. 7. The power electronic converter includes a phase element 68 including two parallel-connected sets of series-connected switching elements 70 to interconnect a DC network 48 and an AC network 52. Each series-connected switching element 70 includes an insulated gate bipolar transistor connected in parallel with an anti-parallel diode. A junction between the series-connected switching elements 70 of each parallel-connected set defines an AC terminal 46 for connection to the AC network 52.

The power electronic converter also includes an auxiliary converter 72 to act as a waveform synthesizer to modify the DC voltage presented to the DC side of the phase element 68. The auxiliary converter 72 is connected in parallel with the phase element 68 to form a single phase converter limb. In other embodiments, the auxiliary converter 72 may be connected in series with the phase element 68 to form the single phase converter limb.

The series-connected switching elements 70 are controlled to switch on and off once every cycle of the frequency of the AC network 52, which is typically 50 Hz or 60 Hz.

The synchronized switching of the series-connected switching elements 70 allows the use of block switching techniques and thereby allows the number of fibre-optic communication channels between the ground level control and the power electronic converter equipment to be minimized.

The auxiliary converter 72 modifies the DC voltage to synthesize a waveform closely approximating a rectified sinusoid for presentation to the DC side of the phase element 68. This results in the production of a near-perfect sine-wave, with minimal harmonic distortion, on the AC side of the phase element 68. The power electronic converter does not therefore require harmonic filters on the AC side of the power electronic converter to control power quality.

This also allows the series-connected switching elements 70 to be switched at near zero voltage and therefore results in almost zero switching losses during normal operation of the power electronic converter.

It is envisaged that in other embodiments, the auxiliary converter may modify the DC voltage to synthesize other waveforms in order to produce other ripple components or minimize the magnitude of the ripple voltage on the DC side of the phase element.

The use of the auxiliary converter 72 means that the voltage profile presented to the string of insulated-gate bipolar transistors 70 is imposed and controlled by the auxiliary converter 72 and is a slowly changing waveform rather than the high voltage steps that would otherwise be presented to the series-connected switching elements 70. It therefore removes the need for complex active gate drives and large voltage sharing components within the main converter design and instead results in simpler, less expensive and more efficient hardware.

In addition, the use of the auxiliary converter 72 enables the voltage imposed on the series-connected switching elements 70 to be rapidly ramped to zero (or minimum value) when required during fault conditions to facilitate soft switching at reduced voltage.

Figure 8:
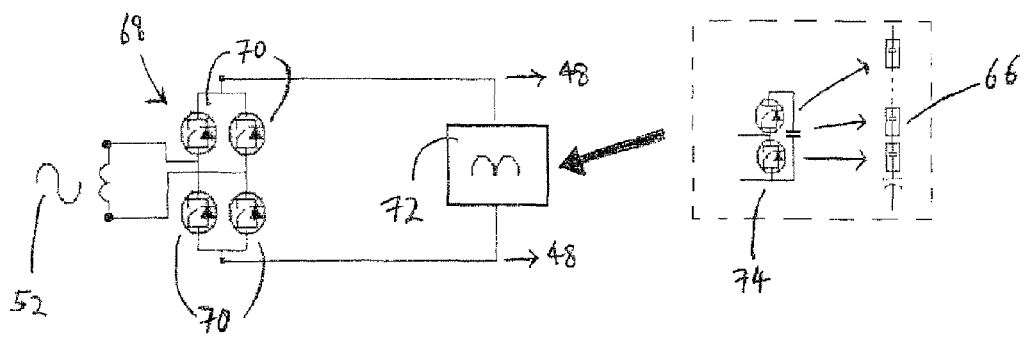
FIG. 8 shows the use of 2-quadrant unipolar modules in the power electronic converter of FIG. 7.

The auxiliary converter 72 in FIG. 7 is a chain-link converter. The chain-link converter 66 is constructed from 2-quadrant unipolar modules 74 connected in series, as shown in FIG. 8. It is envisaged that in other embodiments employing the use of one or more auxiliary converters, the chain-link converter may be constructed from 4-quadrant bipolar modules connected in series.

The use of an auxiliary converter 72 constructed from a chain of modules 74 permits modification of the DC voltage presented to the DC side of the phase element 68 so as to track complex waveforms. It therefore provides an active filtering capability because it allows both fundamental and harmonic frequency voltages to be constructed on the DC side of the phase element 68 and passed to the AC side of the phase element 68 on a single phase basis.

The use of an auxiliary converter 72 constructed from a chain of modules 74 also permits a rapid reduction in the voltage on the AC side of the phase element 68 in the event of both local and remote fault conditions by simply using fewer cells to construct the output waveform presented to the DC side of the phase element 68.

Figure 9:
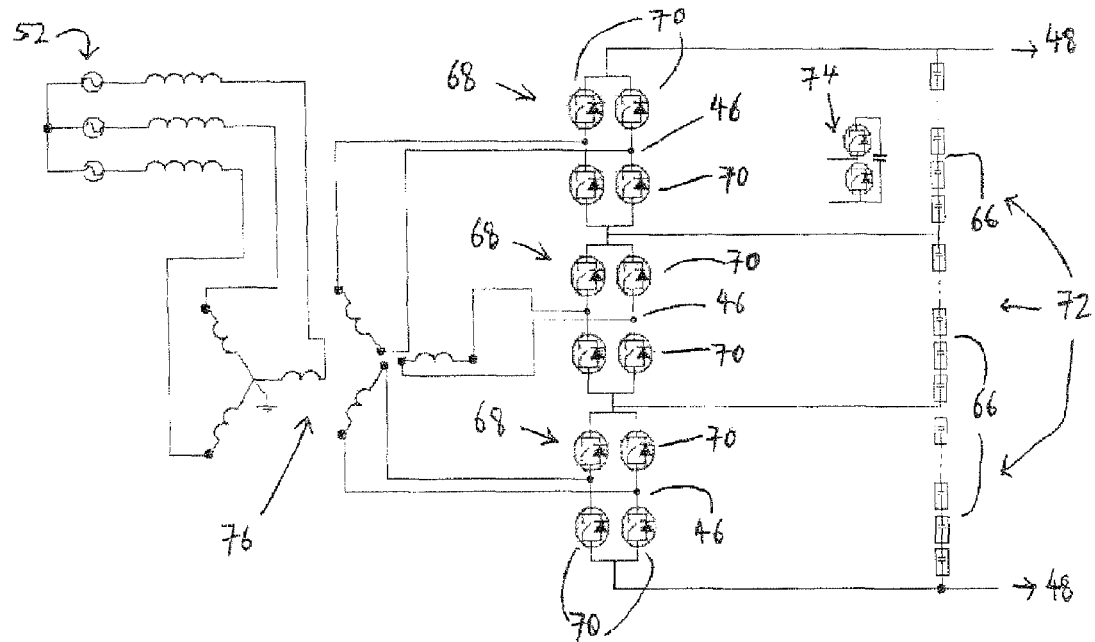
FIG. 9 shows a power electronic converter according to a fifth embodiment of the invention.

A three phase multilevel power electronic converter according to a fifth embodiment of the invention is shown in FIG. 9.

The three phase multilevel converter includes three single phase converters limbs connected in series to form a two terminal DC network for electrical transmission.

The structure and function of each of the single phase converter limbs of the three phase converter is the same as that of the single phase converter limb shown in FIGS. 7 and 8. In other embodiments, the 2-quadrant unipolar modules may be replaced by 4-quadrant bipolar modules.

In each of the embodiments employing the use of multiple auxiliary converters, the auxiliary converters operate independently and 120 electrical degrees part from each other.

In use, the DC output voltage in each three-phase multilevel power electronic converter is the sum of the individual synthesized waveforms operating 120 electrical degrees apart. In normal operation these sum to a $6^{th}$ harmonic ripple voltage at the output of each of the converters.

As outlined above, it is envisaged that in other embodiments other waveforms may be synthesized to produce other ripple components or minimize the magnitude of the ripple voltage at the output of each of the power electronic converters.

Each of the power electronic converters can be considered to produce one "pole" of a DC transmission scheme. Bi-pole schemes may be constructed by connecting two such poles in series on the DC side of the installation.

An additional phase shift of 30 electrical degrees may be introduced by the transformer connection 76 by either configuring a 3-phase star winding into delta (which may be practical on the primary side) or introducing a more complex inter-connected star (or zig-zag) secondary. This has the advantage that the DC output ripple is reduced in magnitude and becomes a $12^{th}$ harmonic waveform.

The capacitors (all capacitors within the chain modules) of the auxiliary converters 72 conduct $2^{nd}$ harmonic current components rather than the fundamental current components experienced by the multilevel converter prior art arrangement shown in FIG. 2. Therefore, for the same current rating, the capacitance required to control ripple voltage excursion is about half the value.

In addition, significantly fewer modules are required in each of the auxiliary converters 72 of the power electronic converters than are required in the prior art arrangement shown in FIG. 2.

Since the converters based on the use of auxiliary converters 72 operate in all four quadrants by controlling the phase angle and magnitude of the AC side converter generated voltage, it may be controlled to act as a rectifier, inverter and to absorb or generate reactive power.

Figure 10:
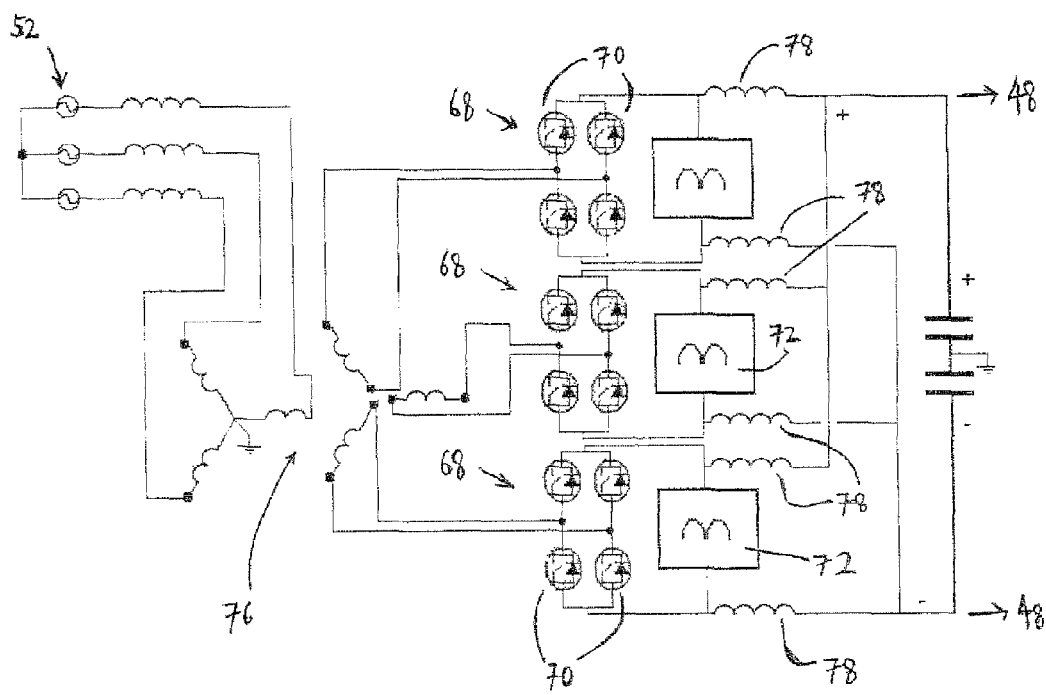
FIG. 10 shows a power electronic converter according to a sixth embodiment of the invention.

In another embodiment, such as the sixth embodiment shown in FIG. 10, three single phase converter limbs may be connected in parallel to form a three phase power electronic converter.

To minimize dynamic interactions, buffer reactors 78 are connected between each of the single phase converter limbs and its neighbors.

Figure 11:
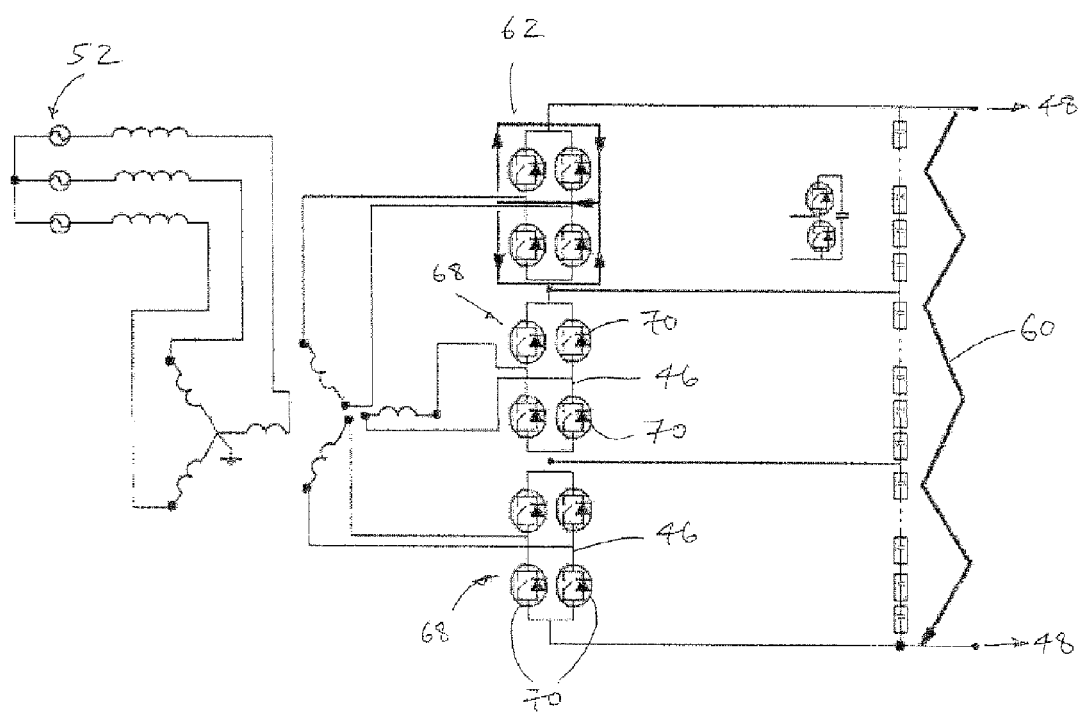
FIG. 11 shows the operation of the power electronic converter of FIG. 9 to minimize fault current flow into and out of the DC network.

FIG. 11 shows the operation of the voltage source converter in FIG. 9 during the occurrence of a fault in the DC network.

In the event of a fault 60 in the DC network 48 that results in high fault current 62 in the power electronic converter, the series-connected switching elements 70 of one or more each phase elements 68 are controllable in use to turn on simultaneously or separately so as to be concurrently in on-states. This leads to a formation of a primary current flow path including the respective phase of the connected AC network 52 and the phase element 68 and bypassing the DC network 48. Consequently the majority of the fault current 62 circulates within the AC network 48 and the phase element 68 i.e. the current 62 flows from the respective phase of the AC network 52 flows into the AC terminals 46 of the phase element 68, through the series-connected switching elements 70 and back into the AC network 52 via the respective AC terminals 46.

In use, the series-connected switching elements 70 of each phase element 58 may switch from being concurrently in on-states at the same time as or separately from the series-connected switching elements 70 of the other phase elements 68.

Operation of the series-connected switching elements 70 in this manner reduces the amount of current flowing through the DC network 48 to near zero current, which allows the fault 62 in the DC network 48 to be isolated from the power electronic converter.

Isolation of the fault 60 may be carried out using an isolator or a circuit breaker such as standard AC side circuit breakers normally used for circuit breaking at zero current.

After the fault 60 in the DC network 48 has been isolated and repaired, the series-connected switching elements 70 of the phase element 68 may be turned off simultaneously or separately so as to switch from being concurrently in on-states to being concurrently in off-states to allow resumption of normal operation of the power electronic converter.

In use, the series-connected switching elements 70 of each phase element 68 may switch from being concurrently in on-states to being concurrently in off-states at the same time as or separately from the series-connected switching elements 70 of the other phase elements 68.

In embodiments of the invention, each switching element is turned off at a predetermined level of current flowing through the respective switching element. Preferably this predetermined level of current is below the peak value of the current flowing through the respective switching element and/or the predetermined level of current is zero current.

Soft switching of each switching element at low or zero current minimizes the switching losses in the respective switching element and thereby improves the overall efficiency of the power electronic converter.

In addition to each of the aforementioned methods, it is also possible to minimize the flow of fault current into the DC network by forming one or more auxiliary short-circuits so as to define one or more auxiliary current flow paths including a respective one of the AC networks and bypassing the power electronic converter and the DC network.

For example, an auxiliary current flow path may be defined by controlling an external crowbar circuit, which includes mechanical or series-connected switching elements, to form an auxiliary short circuit across two or more phases of the AC network.

The provision of the auxiliary current flow path not only allows the fault current to be shared between the primary and auxiliary current flow paths, but also improves the speed of operation when the auxiliary current flow path is formed with the help of mechanical switching.

The invention claimed is:

1. A power electronic converter for use in high voltage direct current power transmission and reactive power compensation comprising a plurality of switching elements interconnecting in use a DC network and one or more AC networks, the plurality of switching elements being controlled in use to form one or more short circuits within the power electronic converter so as to define one or more primary current flow path including a respective one of the AC networks and the power electronic converter and bypassing the DC network, said power electronic converter further including a plurality of converter limbs, each converter limb including first and second DC terminals for connection in use to the DC network and an AC terminal for connection in use to an AC network, each converter limb defining first and second limb portions, each limb portion including an electronic block connected in series between a respective one of the first and second DC terminals and the respective AC terminal, each electronic block including at least one switching element, the or each switching element of each electronic block being controllable in use to switch the respective limb portion in and out of circuit to facilitate the AC to DC power conversion process, each electronic block including at least one primary switching element, the or each primary switching element being connected in series between the respective one of the first and second DC terminals and the respective AC terminal, each electronic block further including at least one chain-link converter and at least one primary switching element connected in series with the or each chain-link converter, wherein the or each chain-link converter includes a chain of modules connected in series, each module including at least one pair of secondary switching elements connected in parallel with an energy storage device, wherein the secondary switching elements are controlled in use such that the chain of modules connected in series provides a stepped variable voltage source, wherein, in the event of a fault in the DC network resulting in high fault current in the power electronic converter, the secondary switching elements of each module are controlled so that the chain-link converters of the first and/or second limb portions concurrently provide zero voltage, and wherein, after the fault in the DC network has been isolated and repaired, the secondary switching elements of each module are controlled so that the chain-link converters of the first and/or second limb portions switch from concurrently providing zero voltage to concurrently providing positive voltage so as to offset the voltage difference between the respective DC and AC terminals.

2. A power electronic converter according to claim 1, wherein the primary switching elements of the first and/or second limb portions are controlled in use to turn on simultaneously or separately so as to be concurrently in on-states.

3. A power electronic converter according to claim 2, wherein the primary switching elements of the first and/or second limb portions are controlled in use to turn off simultaneously or separately so as to switch from being concurrently in on-states to being concurrently in off-states.

4. A power electronic converter according to claim 1, wherein each module includes a pair of secondary switching elements connected in parallel with an energy storage device in a half-bridge arrangement to define a 2-quadrant unipolar module that can provide zero or positive voltage and can conduct current in two directions.

5. A power electronic converter according to claim 1, wherein each module includes two pairs of secondary switching elements connected in parallel with an energy storage device in a full-bridge arrangement to define a 4-quadrant bipolar module that can provide zero, negative or positive voltage and can conduct current in two directions.

6. A power electronic converter according to claim 1, wherein the or each energy storage device is a capacitor, fuel cell, photovoltaic cell, battery or an auxiliary AC generator with an associated rectifier.

7. A power electronic converter according to claim 1, wherein each switching element includes a semiconductor device.

8. A power electronic converter according to claim 7, wherein the semiconductor device is an insulated gate bipolar transistor, a gate turn-off thyristor, a field effect transistor, an insulated gate commutated thyristor or an integrated gate commutated thyristor.

9. A power electronic converter according to claim 7 wherein the semiconductor device is connected in parallel with an anti-parallel diode.

10. A method of operating a power electronic converter according to claim 1, the method comprising the step of, upon detection of a fault in the DC network, controlling the plurality of switching elements to form one or more short circuits within the power electronic converter so as to define one or more primary current flow paths, the or each current flow path including a respective one of the AC networks and the power electronic converter and bypassing the DC network, wherein, in the event of a fault in the DC network resulting in high fault current in the power electronic converter, the secondary switching elements of each module are controlled so that the chain-link converters of the first and/or second limb portions concurrently provide zero voltage, and wherein, after the fault in the DC network has been isolated using one or more isolators and/or one or more circuit breakers and repaired, the secondary switching elements of each module are controlled so that the chain-link converters of the first and/or second limb portions switch from concurrently providing zero voltage to concurrently providing positive voltage so as to offset the voltage difference between the respective DC and AC terminals.

11. A method according to claim 10, wherein the or each short circuit is formed by controlling the primary switching elements of the first and/or second limb portions to turn on simultaneously or separately so as to be concurrently in on-states.

12. A method according to claim 10, further including the step of controlling the switching elements to remove the or each short circuit after isolating the fault in the DC network.

13. A method according to claim 10, wherein the or each short circuit is removed by controlling the primary switching elements of the first and/or second limb portions to turn off simultaneously or separately so as to switch from being concurrently in on-states to being concurrently in off-states.

14. A method according to claim 10, wherein each switching element is turned off at a predetermined level of current flowing through the respective switching element.

15. A method according to claim 14, wherein the predetermined level of current is below the peak value of the current flowing through the respective switching element.

16. A method according to claim 14, wherein the predetermined level of current is zero current.

17. A method according to claim 10, further including the step of, upon detection of a fault in the DC network, forming one or more auxiliary short-circuits to define one or more auxiliary current flow paths including a respective one of the AC networks and bypassing the power electronic converter and the DC network.

18. A method according to claim 17, wherein the or each auxiliary short circuit is formed across two or more phases of the AC network.

19. A method according to claim 17 wherein the or each auxiliary short-circuit is formed by controlling at least one external crowbar circuit, the or each crowbar circuit including one or more mechanical or semiconductor switches.

* * * * *